2 Sheets—Sheet 2.

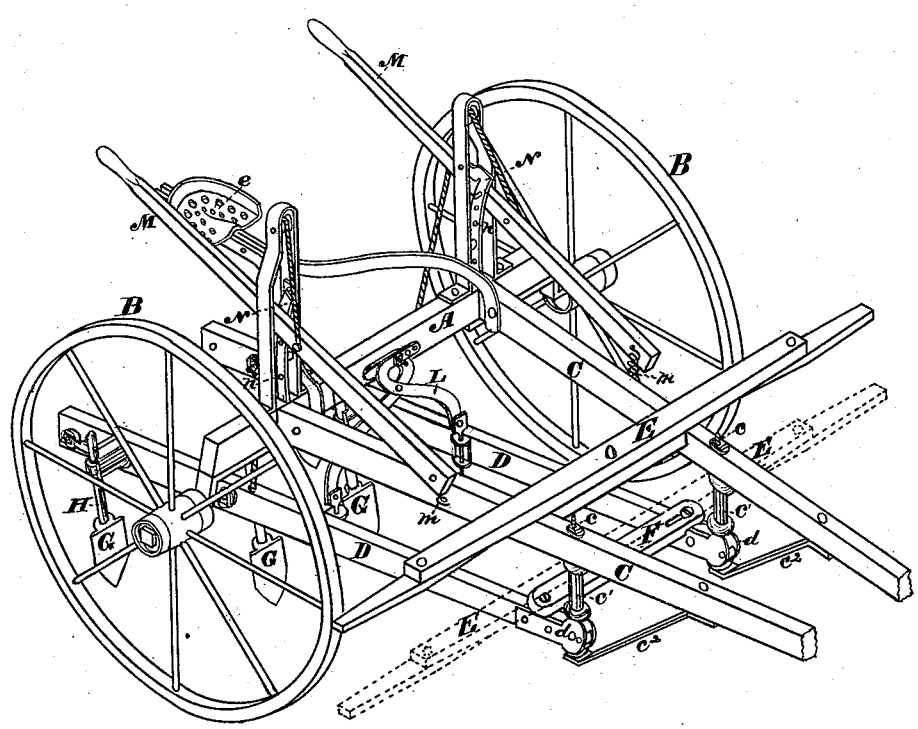

S. DAHLBOM.
WHEEL-CULTIVATOR.

No. 186,713. Patented Jan. 30, 1877.

Attest
W. S. Baker,
L. M. Harris.

Inventor
Swain Dahlbom
By Coburn & Thacher
Attorneys.

UNITED STATES PATENT OFFICE.

SWAIN DAHLBOM, OF CARPENTERVILLE, ILLINOIS.

IMPROVEMENT IN WHEEL-CULTIVATORS.

Specification forming part of Letters Patent No. 186,713, dated January 30, 1877; application filed June 12, 1876.

*To all whom it may concern:*

Be it known that I, SWAIN DAHLBOM, of Carpenterville, in the county of Kane and State of Illinois, have invented a new and useful Improvement in Wheel-Cultivators, which is fully described in the following specification, reference being had to the accompanying drawings, in which—

Figure 5:
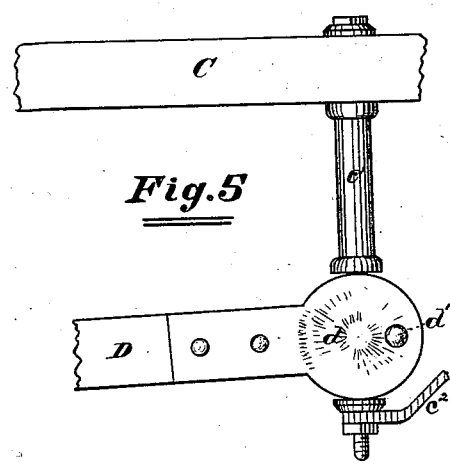
Figure 6:
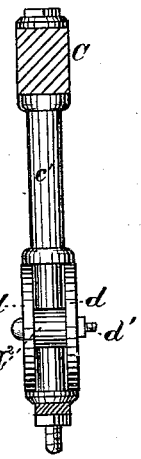
Figure 7:
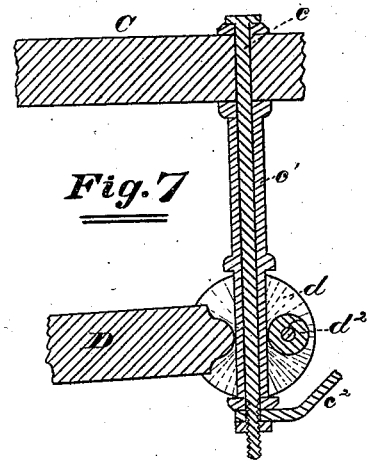
Figure 8:
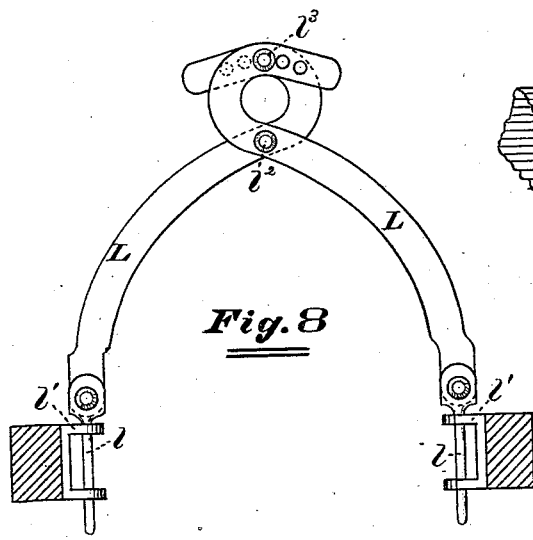

Figure 1 represents a perspective view of the machine with my improvements attached; Figs. 2, 3, and 4, detail views, showing the mode of attaching the shovels to the draft-bars; Figs. 5, 6, and 7, detail views of the devices by means of which the beams are attached to the draft-frame; Fig. 8, a view of the arch or device for regulating the distance between the draft-bars; and Fig. 9, a view of the cross-bar at the front end of the draft-bars, to which the draft may be attached.

My invention consists in attaching the evener to a cross-bar on the forward ends of the draft-bars, so that the draft will be in line with said beams; also, in making the draft attachment adjustable, so that the machine may be used with either high or low draft; also, in a device (which I call an "arch") for uniting the draft-bars, and adjusting the distance between them; also, in devices for attaching the standards to the draft-bars.

In the drawings, A represents the main axle, on which are mounted two supporting-wheels, B B, and to which are attached, in the usual manner, the hounds C, by means of which the pole is connected to the machine. The draft-bar D, to which the shovels are attached, are provided at their forward ends with coupling plates or disks $d$. These plates are attached to the bars, one on each side, and extend beyond the ends of the bars, the forward ends being enlarged, as shown in Figs. 5 and 7 of the drawings. Bolts $c$ are passed through the hounds C at points a little in front of the wheels B, and upon the bolts below the hounds C are placed tubular bearings $c^1$, and secured in place by nuts upon the lower ends of the bolts $c$. The draft-bars D are secured to the frame by placing the lower end of the tube $c^1$ between the forward ends of the plates $d$, so that the latter will brace the former between collars thereon, as shown in Figs. 5 and 6 of the drawings.

A bolt, $d^1$, is put through holes in the two plates $d$, just in front of the pendent post $c^1$. A washer, $d^2$, is placed upon the bolt between the disks $d$, and the bolt is securely held in position by the nut.

The forward ends of the draft-bars D are rounded, as shown in Fig. 7 of the drawings, and the attachment of said bars to the posts $c^1$, described above, permits the draft-bars to rise and fall vertically, and to be swung laterally, without the necessity of a complicated swiveling connection. Braces $c^2$ extend from the lower ends of the bolts $c$ forward and upward to the hounds C, so as to give the posts to which the draft-bars are attached a firm support.

Heretofore, a serious objection to wheel-cultivators has been occasioned by the location of the draft attachment upon the top of the frame, so that when the shovels are located between the wheels, and the draft-bars extend forward and are attached to the frame in front of the axle, there is a severe downward thrust upon the draft-frame, which is transferred immediately to the necks of the horses.

To obviate this objection I attach the evener E to a cross-bar, F, which is attached to the draft-bars D, near their forward ends. By this arrangement it is obvious that the draft is brought nearly in line with the draft-bars D, thereby relieving the downward thrust upon the frame, and lightening the load upon the necks of the horses. As the evener in this position, however, would interfere with the operation of the machine in cultivating corn of a large growth, I also provide for attaching the evener to the top of the draft-frame, in the usual manner, so that it will pass over the standing corn in the rows without injury; and for this purpose the cross-bar F is also made detachable from the draft-bars E. The lower position of the evener is shown in dotted lines in Fig. 1 of the drawings.

Figure 9:
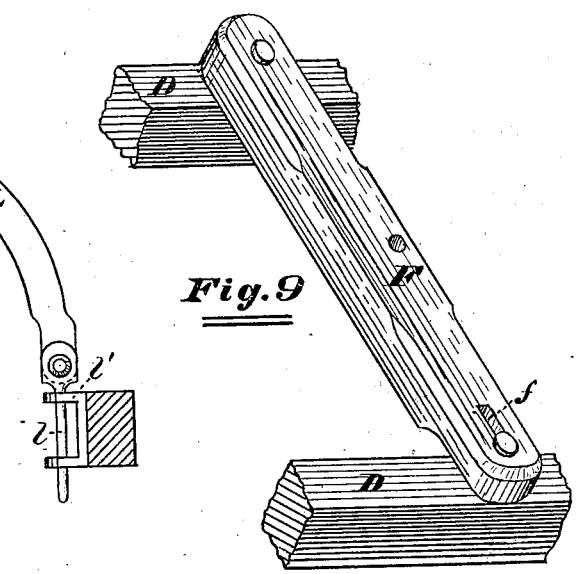

In order to permit the draft-bars D to rise and fall independently of each other, the cross-bar F has a slot, $f$, at one end, through which the bolt passes which fastens it to the draft-bar. The lower side of the bar F is also rounded at this end, as shown in Fig. 9 of the drawings. With this construction the cross-bar does not interfere with the independent vertical movement of the draft-bars D. The other end of the bar F may be constructed in a like manner, if desirable, but it is not necessary. It is desirable, however, that the securing-bolt should not be perfectly tight at this end of the bar. The shovels G are secured to the standard H by means of an eye, $g$, on the upper end of the shovels, through which the lower end of the standard is thrust, and by a bolt attached to the shovel, and passing through the lower end of the standard, and secured by a nut, as shown in Figs. 2 and 3 of the drawings.

The standard H passes up through an eye, $h$, in one end of a bolt, $h'$, which is put through a hole in the rear end of the draft-bars D, and secured by a nut and washer on the other side. A clamping-piece, I, is placed upon the bolt $h'$, between the beam D and the standard H. The outer end of this clamp I is recessed, as shown in Figs. 3 and 4 of the drawings, to receive the eye $h$ and standard H, into which these parts are drawn by turning up the nut on the other end of the bolt $h'$, when they will be held securely in the position in which they are placed.

The inner face of the clamp I is provided with a narrow flange, $i$, around the bolt $h'$, as shown in Fig. 4 of the drawings. The draft-bar D is recessed, so as to receive this flange, which forms a partial bearing for the clamp I, and makes a stronger and more secure fastening.

A stop, K, is pivoted to the rear end of the bar D by a pivot-bolt, $k$. This stop has a small projection at its forward end, which rests upon the rear end of the clamp I, which may be cut away at one corner for this purpose, if desired, and holds the clamp from turning in ordinary work; but the clamp I and stop K are adjusted so that they will turn when a great strain is brought upon the shovels G, the backward turn of the stop permitting the upward throw of the rear projection of the clamp I, so that the shovels may be turned backward to pass obstacles against which they may strike, thus preventing breakage.

An S-shaped arm, L, is pivoted at its lower end to bolts $l$, which pass loosely through holes in plates $l^1$ on the draft-bars D. These arms L are connected together near their upper ends by a pivot, $l^2$, and at their extreme upper ends are provided with a series of holes, through which a bolt, $l^3$, is placed. By adjusting these arms upon the pivot $l^2$, by changing the bolt $l^3$ from one set of holes to another, the distance between the draft-bars D is adjusted so as to suit the different distances between the rows of corn, and the swivel-connection between these arms and the draft-bars permits the latter to rise and fall with freedom. The lifting-levers M, instead of being pivoted to the frame, are attached thereto by means of springs $m$, which may be of any suitable construction, to permit the levers to be vibrated up and down, and at the same time act to hold them in place when engaged with the holding-segments N. These segments are provided with a series of holes, $n$, into which pins on the levers M enter. Any other ordinary holding device may be substituted, however, for this latter construction.

The lifting-cords extend from the levers up over pulleys in supporting-frames on the axle, and down to the draft-bars in a well-known way. A seat, $e$, for the driver, is mounted in any suitable manner and position upon the frame, if it is desired; but the features of novelty in my machine are alike applicable to either riding or walking cultivators.

Having thus described my invention, what I claim as new, and desire to secure by Letters Patent, is—

1. In a wheeled cultivator, the draft-bars of which extend in front of the axle, the combination of the draft-bars D, cross-bar F, constructed as described, and connected to both draft-bars, and evener E, attached to and supported by the cross-bar on the forward ends of the draft-bars, substantially as and for the purpose set forth.

2. In a wheeled cultivator, the draft-bars D, arranged between the wheels, and extending in front of the axle, in combination with a draft-supporting bar, connected to their forward ends, and an upper draft-frame, provided also with a draft-supporting bar arranged above the former, whereby the machine is adapted to high or low draft by changing the evener from one support to the other, substantially as described.

3. The bent arms L, constructed as described, pivoted together, and adjustably connected together at their upper ends, in combination with the draft-bars D, connected thereto by swivel-joints, substantially as and for the purpose set forth.

4. The combination of the clamping-piece I, constructed with a projecting bearing-flange, $i$, eyebolt $h'$, standard H, and draft-bar D, substantially as described.

5. The combination of the standard H, holding-clamp I, and pivoted stop K, substantially as and for the purpose set forth.

SWAIN DAHLBOM.

Witnesses:
C. BANCROFT,
C. E. GRIFFITH.